No. 865,534. PATENTED SEPT. 10, 1907.
G. P. SAMPSON.
DRAFT EQUALIZER.
APPLICATION FILED FEB. 24, 1906.

Witnesses.
A. G. Hague
A. E. Woody

Inventor, George P. Sampson
by Orwig & Lane Att'ys

UNITED STATES PATENT OFFICE.

GEORGE P. SAMPSON, OF NEWTON, IOWA.

DRAFT-EQUALIZER.

No. 865,534.            Specification of Letters Patent.            Patented Sept. 10, 1907.

Application filed February 24, 1906. Serial No. 303,067.

*To all whom it may concern:*

Be it known that I, GEORGE P. SAMPSON, a citizen of the United States, residing at Newton, in the county of Jasper and State of Iowa, have invented a certain new and useful Draft-Equalizer, of which the following is a specification.

The objects of my invention are to provide a draft equalizer of simple, durable and inexpensive construction of the class in which the draft center of the draft bar is thrown to one side of the draft center of the equalizer bar.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1:
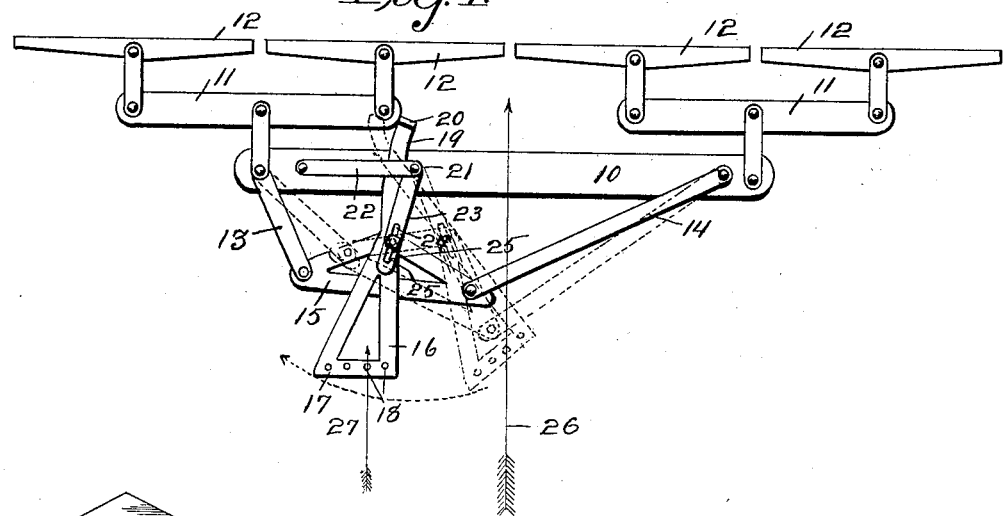
Figure 2:
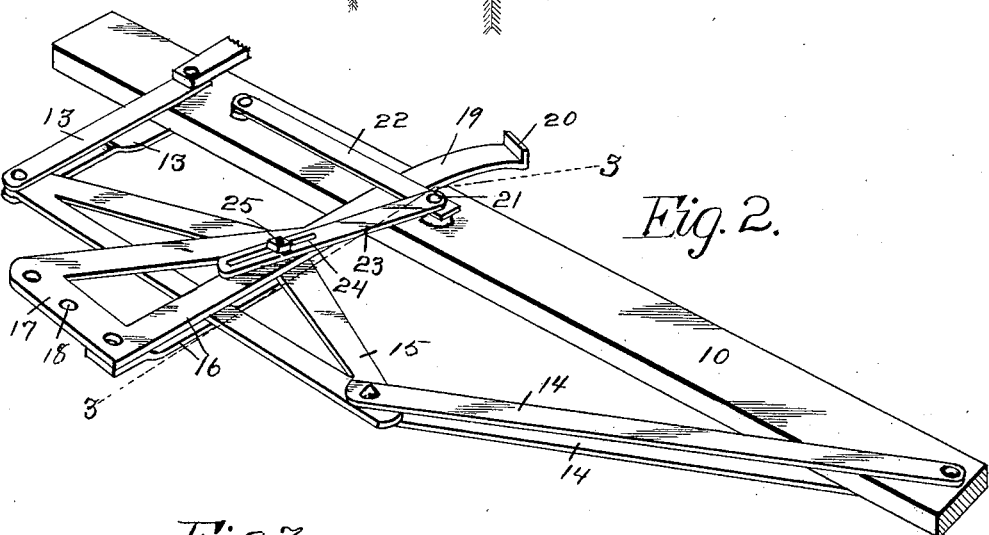
Figure 3:
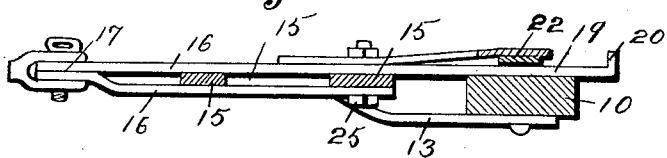

Figure 1 shows a top or plan view of the complete device. The dotted lines show the draft bar directly in line fore and aft with the draft center of the equalizer bar and the solid lines show the draft bar in the position it would assume when the device is in use and is being advanced on a straight line. Fig. 2 shows a perspective view of the complete device with the double-trees omitted, and Fig. 3 shows a transverse, sectional view on the line 3—3 of Fig. 2.

Referring to the accompanying drawings, I have used the reference numeral 10 to indicate the equalizer bar provided with two double-trees 11 connected with its opposite ends, said double-trees in turn each provided with two swingle-trees 12.

Near one end of the equalizer bar, I have pivoted two short links 13 and near the other end of the equalizer bar two long links 14 are pivoted. These links project rearwardly from the equalizer bar and their rear ends pivotally support a lever 15. By reason of the difference in length of the links 13 and 14, the said lever 15 is supported at one side of the draft center of the equalizer bar.

Pivoted to the central portion of the lever 15 is a draft bar 16 arranged substantially on a fore and aft line and formed with a lateral extension 17 at its rear end provided with a number of openings 18 to provide means by which the draft bar may be attached to a vehicle. On the forward end of the draft bar 16 is a guide arm 19 which projects forwardly over the equalizer bar and its forward end is curved slightly in a direction toward the draft center of the equalizer bar. At said forward end is an upwardly projecting lug 20 for purposes hereinafter made clear.

The numeral 21 indicates a bolt fixed to the equalizer bar and this bolt serves to support a keeper 22, the other end of which is supported by a bolt fixed to the equalizer bar, said keeper being supported far enough above the equalizer bar 10 to admit the guide bar 19 under it and the bolt 21 also serves to limit the lateral movement of the guide arm 19 in a direction toward the draft center of the equalizer bar.

23 indicates a limiting arm pivoted to the bolt 21 projecting rearwardly and formed with a slot 24 to receive the bolt 25, which bolt serves to pivotally connect the draft bar 16 with the lever 15. This limiting arm serves the function of limiting the movement of the lever 15 when the draft equalizer is being turned around when in use.

In Fig. 1, the arrow 26 indicates the draft center of the equalizer bar 10 and the arrow 27 indicates the draft center of the draft bar 16 when the parts are in the position shown in solid lines in Fig. 1.

In practical use and assuming that four draft animals are attached to the swingle-trees 12 and assuming further that the draft bar 16 is in the position shown by dotted lines in Fig. 1, then if the draft animals were advanced in a straight line and a vehicle attached to the draft bar, then the draft bar would swing relative to the equalizer bar to the position shown in solid lines in Fig. 1 for the reason that the guide arm 19 would engage and slide upon the bolt 21 and cause the draft bar to stand in position substantially in line with the fore and aft line through the equalizer bar. However, the draft bar is not rigidly supported in the position, shown by solid lines in Fig. 1, and if it is desired to turn the draft animals around, the draft bar may swing relative to the equalizer bar in one direction as far as the position shown by dotted lines in Fig. 1, and as the draft animals are turned around in an opposite direction, the draft bar will swing relative to the equalizer bar to position with the guide arm 19 adjacent to the forward end of the link 13, the movement in this direction being limited by the bolt 25 in the slot 24 and by the lug 20 engaging the keeper 22.

Having thus described my invention what I claim and desire to secure by Letters Patent of the United States, therefor is—

1. An improved draft equalizer, comprising an equalizer bar, links pivoted to the opposite ends of the equalizer bar and projected rearwardly, a lever pivoted to the rear ends of said links, a draft bar pivoted to said lever, a link pivoted to the equalizer bar and pivoted to said lever and a guide arm connected with the draft bar and projected over the equalizer bar and means for limiting the movement of the guide arm toward the draft center of the equalizer bar.

2. An improved draft equalizer, comprising an equalizer bar, a short link and a long link pivoted to opposite ends of the equalizer bar and projected rearwardly, a lever pivoted to the rear ends of said links, a draft bar pivoted to the said lever having means at its rear end for attachment to vehicles and having a guide arm at its forward end projected adjacent to the equalizer bar, means for limiting the movement of said guide arm in a direction toward the draft center of the equalizer bar and a link pivoted to the equalizer bar and pivotally and adjustably connected with the draft bar and with said lever at a point between the equalizer bar and the rear end of the draft bar.

3. An improved draft equalizer comprising an equalizer bar, two short links pivoted to one end of the equalizer bar and projected rearwardly, two long links pivoted to the other end of the equalizer bar and projected rearwardly and laterally toward the draft center of the equalizer bar, a triangular lever having its ends pivotally supported between the rear ends of said links, a draft bar pivoted to said lever and formed with a lateral extension at its rear end provided with openings and also formed with a guide arm at its forward end projecting over the equalizer bar at one side of its draft center and formed with a lug at its forward end, a bolt fixed to the equalizer bar to limit the movement of the guide arm toward the draft center of the equalizer bar, a keeper supported by the equalizer bar, above the guide arm and in position to be engaged by the lug of the guide arm and a limiting arm pivoted to the equalizer bar and having a limited sliding connection with the draft bar at the point where it is pivoted to the lever.

GEORGE P. SAMPSON.

Witnesses:
C. J. IRISH,
B. R. YOUNG.